(12) United States Patent
Huang

(10) Patent No.: US 8,483,159 B2
(45) Date of Patent: Jul. 9, 2013

(54) METHOD AND APPARATUS FOR FREQUENCY OFFSET COMPENSATION

(75) Inventor: Hui Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 257 days.

(21) Appl. No.: 12/815,079

(22) Filed: Jun. 14, 2010

(65) Prior Publication Data

US 2010/0246528 A1 Sep. 30, 2010

Related U.S. Application Data

(63) Continuation of application No. PCT/CN2008/073421, filed on Dec. 10, 2008.

(30) Foreign Application Priority Data

Dec. 13, 2007 (CN) .......................... 2007 1 0195366

(51) Int. Cl.
*H04W 4/00* (2009.01)

(52) U.S. Cl.
USPC ............ 370/329; 370/230; 375/260; 375/350

(58) Field of Classification Search
USPC ................. 370/330, 329, 331, 334, 230, 235, 370/432.1, 442, 436; 455/432.1, 442, 436; 375/260, 346, 350
See application file for complete search history.

(56) References Cited

U.S. PATENT DOCUMENTS

| | | | |
|---|---|---|---|
| 2008/0089286 A1* | 4/2008 | Malladi et al. | 370/330 |
| 2008/0232516 A1* | 9/2008 | Cheng et al. | 375/344 |
| 2010/0027482 A1 | 2/2010 | Murakami et al. | |

FOREIGN PATENT DOCUMENTS

| | | |
|---|---|---|
| CN | 1342004 A | 3/2002 |
| CN | 1595829 A | 3/2005 |
| CN | 1665230 A | 9/2005 |
| CN | 1277359 C | 9/2006 |
| CN | 1291561 C | 12/2006 |
| CN | 101184075 A | 5/2008 |
| JP | 2002261641 A | 9/2002 |
| JP | 2004072458 A | 3/2004 |
| JP | 2007267165 A | 10/2007 |
| JP | 2007300192 A | 11/2007 |
| WO | 2004006524 A1 | 1/2004 |
| WO | 2007078101 A1 | 7/2007 |

OTHER PUBLICATIONS

Written Opinion of corresponding PCT Patent Application No. PCT/CN2008/073421, mailed on Mar. 29, 2009, 4 pages total.
Corresponding granted Chinese Patent No. 101184075 (Application No. 200710195366.9) citing prior art at Item (56), issued Jan. 4, 2012, 1 page only.
First office action issued in corresponding Japanese patent application No. 2010521291, dated Feb. 21, 2012, and English translation thereof, total 4 pages.
Reject decision issued in corresponding JP application No. 2010521291, Nov. 13, 2012, and an English translation thereof, total 4 pages.

* cited by examiner

*Primary Examiner* — Dady Chery

(57) ABSTRACT

Frequency offset compensating methods and apparatus are provided. A frequency offset of a terminal according to the pilots is estimated, and terminals are grouped according to the frequency offset of the terminals. The terminals in different frequency offset groups are dispatched and are scheduled to occupy the time frequency resources in different time slices. Frequency offset compensation is carried on for each group of terminals by using a corresponding frequency offset compensation value.

18 Claims, 5 Drawing Sheets

METHOD AND APPARATUS FOR FREQUENCY OFFSET COMPENSATION

CROSS-REFERENCE TO RELATED APPLICATIONS

This application is a continuation of International Application No. PCT/CN2008/073421, filed on Dec. 10, 2008, which claims priority to Chinese Patent Application No. 200710195366.9, filed on Dec. 13, 2007, both of which are hereby incorporated by reference in their entireties.

FIELD OF THE INVENTION

The present invention relates to communication technologies, and in particular, to a method and apparatus for frequency offset compensation.

BACKGROUND OF THE INVENTION

The Worldwide Interoperability for Microwave Access (WiMAX) technology is one of the most influential broadband radio access technologies currently. The WiMAX system can provide mobile broadband services, and are applicable to radio access services on an express railway.

The WiMAX system is based on an Orthogonal Frequency Division Multiplexing (OFDM) technology. After being scheduled by a Base Station (BS), different time frequency resources are allocated to the data of different terminals. At the transmitter, the data of each terminal is mapped to a different sub-carrier, and the data over the sub-carrier is transformed to the time domain through Inverse Fast Fourier Transform (IFFT). The receiver uses Fast Fourier Transform (FFT) to transform the time domain signals to the frequency domain to recover the data over the sub-carrier, and then the data of one terminal is separated from the data of another terminal through sub-carrier demapping.

When the WiMAX technology is applied to an express railway and provides access services for the terminals on the express railway, because the train that is running on the express railway moves very quickly, the terminals on the train also move quickly relative to the BS. Quick movement leads to the Doppler frequency offset of the signals received by each terminal and the BS. The Doppler frequency offset is in proportion to the movement speed of the terminal and the carrier frequency. For example, if the carrier frequency is 2.5 GHz and the movement speed of the terminal is 430 km/h, the Doppler frequency offset is up to 2 kHz.

A frequency offset Leads to sub-carrier amplitude attenuation, sub-carrier crosstalk and channel estimation errors. To relieve the impact of the frequency offset, frequency offset compensation is required.

The frequency offset compensation method specified in the WiMAX protocol is: The base station (BS) calculates the frequency offset compensation value and delivers an adjustment command, and the terminal adjusts the transmitting frequency of the terminal in response to the BS command.

The WiMAX protocol specifies that the BS may deliver a frequency offset compensation value to the terminal through a message to adjust the transmitting frequency of the terminal. The protocol specifies how the terminal processes the frequency offset. In the synchronization stage, the terminal locks the received BS signal in the allowed frequency offset scope, and uses the BS signal frequency as the frequency of the uplink transmit signal. In the normal working mode, the terminal locks the downlink signal of the BS. The BS estimates the frequency offset by using the pilot signal in the uplink burst allocated to the terminal, calculates the frequency offset compensation value according to the frequency offset estimation result, and delivers the frequency offset compensation value to the terminal through a message. When determining the transmitting frequency, the terminal accumulates the frequency offset compensation value sent by the BS, and applies the accumulated frequency offset compensation value to the downlink receiving frequency to get an uplink transmitting frequency.

In the process of implementing the present invention, the inventor finds at least the following deficiencies in the prior art:

The BS needs to deliver a message, which occupies the downlink air interface bandwidth.

After calculating the frequency offset compensation value, the BS needs to wait for the BS scheduler to allocate the available air interface downlink resources; when any air interface downlink resource is available, the BS delivers the frequency offset compensation value to the terminal through a message; after receiving the message, the terminal obtains the frequency offset compensation value through demodulation, and then adjusts the frequency offset according to the frequency offset compensation value. That process consumes considerable of time, involves a long processing delay, and responds to the frequency offset change slowly.

SUMMARY OF THE INVENTION

Embodiments of the present invention provide a Method and Apparatus for Frequency Offset Compensation. Through the method and apparatus, the process of frequency offset compensation does not occupy the downlink air interface bandwidth and responds to the frequency offset change quickly.

A method for frequency offset compensation provided in an embodiment of the present invention includes:

estimating frequency offset of a terminal according to pilots in the uplink signals of the terminal;

grouping terminals according to the frequency offset of each terminal by allocating the terminals that can use the same frequency offset compensation value for compensation into a same group;

scheduling the terminals in different groups to enable the terminals in different groups to occupy time frequency resources in different time segments; and performing compensation for the frequency offset of the terminals in each group with frequency offset compensation value corresponding to each group.

An apparatus for frequency offset compensation provided in an embodiment of the present invention includes:

a frequency offset estimating unit, configured to estimate the frequency offset of a terminal according to pilots in the uplink signals of the terminal;

a grouping unit, configured to group terminals according to the frequency offset of each terminal by allocating the terminals that can use the same frequency offset compensation value for compensation into a same group;

a scheduling unit, configured to schedule the terminals in different groups to enable the terminals in different groups to occupy time frequency resources in different time segments; and a compensating unit, configured to perform compensation for the frequency offset of the terminals in each group with frequency offset compensation value corresponding to each group.

In the technical solution provided by the present invention, the terminals with a similar frequency offset are put into one group. The same frequency offset compensation value can be used to compensate for the frequency offset of the terminals in a group, and terminals in different groups are scheduled to different time segments to occupy time frequency resources in different time segments. In this way, the BS can use a frequency offset compensation value to compensate for the frequency offset of the terminals in a group at a time point, and does not need to occupy the downlink air interface resources, thus saving the radio air interface resources. It is not necessary for the terminal to wait for the scheduler to deliver a message, and it is not necessary for the terminal to perform demodulation. Relative to the prior art, the embodiments of the present invention involve short delay and respond to the frequency offset change quickly.

DETAILED DESCRIPTION OF THE EMBODIMENTS

The embodiments of the present invention provide a Method and Apparatus for Frequency Offset Compensation. Through the method and apparatus, the process of frequency offset compensation does not occupy the downlink air interface bandwidth and responds to the frequency offset change quickly.

In a scenario of high-speed movement of terminals, it is possible that multiple terminals move at the same speed. For example, on an express railway, the terminals on the same train move at the same speed relatively to the same BS, and generate almost the same Doppler frequency offset. The frequency offset compensation method under the present invention estimates the Doppler frequency offset of different terminals, groups the terminals according to the Doppler frequency offset of each terminal, schedules the time frequency resources of the uplink frame, prevents time overlap of the time frequency resources occupied by the terminals in different groups, determines the frequency offset compensation value according to the group, and compensates for the frequency offset for terminals in a group within a time segment.

For brevity, the Doppler frequency offset is referred to as "frequency offset" below.

Figure 1:
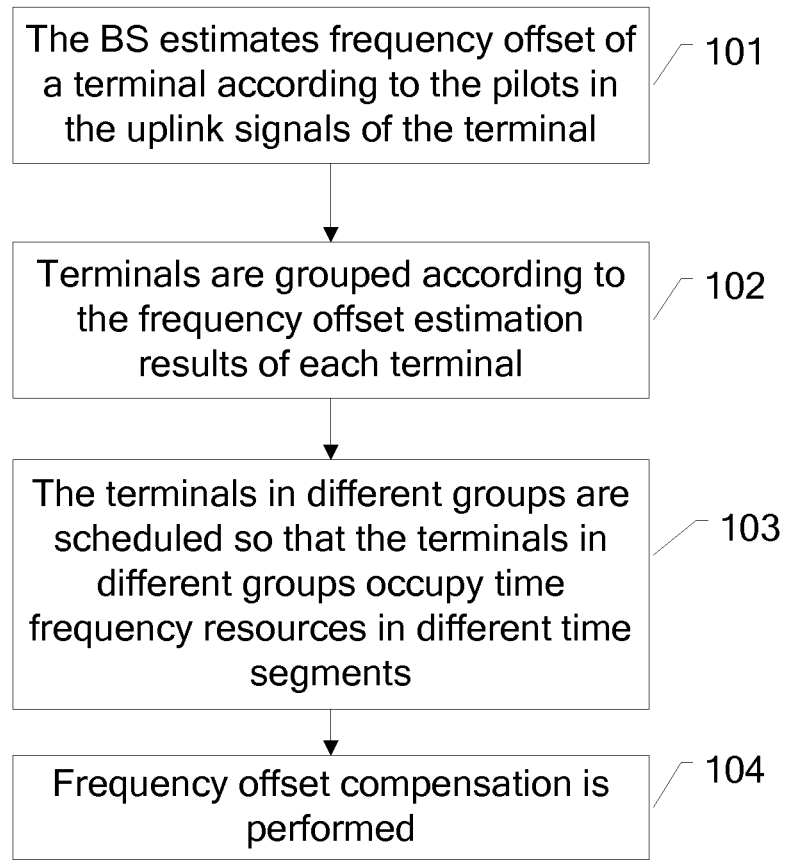
FIG. 1 is a flowchart of a method for frequency offset compensation in an embodiment of the present invention.

FIG. 1 is a schematic flowchart of a method for frequency offset compensation in an embodiment of the present invention. The method includes:

Step 101: The BS estimates frequency offset of a terminal according to the pilots in the uplink signals of the terminal.

The BS calculates the auto-correlation value of the pilots which are in the same sub-carrier location but in different symbol locations, and accumulates auto-correlation values of the pilots in a frame to obtain the auto-correlation estimation result $r_i(n)$ of active terminal i of uplink frame n. If uplink frame n allocates no time frequency resources to terminal i, $r_i(n)$ of the terminal i is equal to 0.

Through this auto-correlation estimation result, an estimation result of the frequency offset of the terminal may be obtained directly. Supposing the estimation result of the frequency offset of the terminal is $\Delta f_i(n)$ in the case that uplink frame n has allocated time frequency resources to the terminal i, $\Delta f_i(n)$ may be calculated through this formula:

$$\Delta f_i(n)=k*\mathrm{phase}(r_i(n))$$

where k is a constant, and its value depends on the symbol spacing between the pilots which are used for calculating the correlation value, and phase($r_i(n)$) is the phase of $r_i(n)$. If uplink frame n allocates no uplink resource to a terminal, BS does not output the frequency offset estimation result of the terminal of this frame.

Further, an Infinite Impulse Response (IIR) filter may be used to filter the auto-correlation output of each frame to reduce the impact of noises. Supposing that $\alpha$ is a filtering coefficient and the filtering result is $R_i(n)$ after the auto-correlation estimation result $r_i(n)$ of active terminal i of uplink frame n is filtered, the filtering formula is:

$$R_i(n)=(1-\alpha)R_i(n-1)+\alpha r_i(n)$$

where the filtering coefficient $\alpha$ is an empiric value, and is generally ½, ¼ or ⅛ which facilitates using shift calculation to speed up the calculation.

In this case, $\Delta f_i(n)$, the frequency offset of the terminal in the case that uplink frame n allocates time frequency resources to it, is:

$$\Delta f_i(n)=k*\mathrm{phase}(R_i(n))$$

where k is a constant, and its value depends on the symbol spacing between the pilots, which are used for calculating the correlation value, and phase($R_i(n)$) is the phase of $R_i(n)$. If uplink frame n allocates no uplink resource to a terminal, BS does not output the frequency offset estimation result of the terminal of this frame.

Step 102: Terminals are grouped according to the frequency offset estimation results of each terminal.

The possible frequency offset range is divided into N sections beforehand according to these grouping criteria: The same frequency offset compensation value can be used to compensate for frequency offset in each section, and then the terminals whose frequency offset values that fall within the same frequency offset section are put into one group according to the frequency offset estimation result of each terminal.

Alternatively, the terminals with a similar frequency offset are put into one group according to the frequency offset estimation result of each terminal. The grouping criteria are: The same frequency offset compensation value can be used to compensate for the frequency offset of the terminals in the same group.

Other grouping methods may also be applied. The grouping result is that: The same frequency offset compensation value can be used to compensate for the frequency offset of the terminals in the same group.

For example, when a WiMAX system is used to provide access services for the terminals on the express railway, the movement states of the terminals relative to the BS fall into three categories:

The first category: Terminals on a train which leaves a BS quickly. The states of terminals in the first category are moving away from the BS at a high speed.

The second category: Terminals on a train which runs at a low speed, for example, a train arriving at a railway station or getting out of a railway station. The states of terminals in the second category are moving at a very low speed relatively to the BS, which generate a low frequency offset. It is not necessary to compensate for the frequency offset of such terminals.

The third category: Terminals on a train which approaches a BS quickly. The states of terminals in the third category are moving toward the BS at a high speed.

If the frequency offset range is divided into N sections beforehand, according to the theoretic movement speed of the train, the estimated frequency offset generated by the terminals in the first category should be greater than 500 Hz; the estimated frequency offset generated by the terminals in the second category above should range from −500 Hz to 500 Hz, and the frequency offset in this range needs no compensation, and the estimated frequency offset generated by the terminals in the third category above should be less than −500 Hz.

In this case, the frequency range is divided into three sections beforehand: greater than 500 Hz; −500 Hz to 500 Hz; and less than −500 Hz. According to the estimated frequency offset of the terminal, the BS puts the terminals with a frequency offset greater than 500 Hz into a same group, puts the terminals with a frequency offset between −500 Hz and 500 Hz into a same group, and puts the terminals with a frequency offset less than −500 Hz into a same group.

At the time of grouping, a terminal grouping decision is made for each frame, and the terminals are allocated into the corresponding group. The grouping decision process is as follows:

The terminals that need no frequency offset compensation are marked as non-decision terminals according to the terminal frequency offset estimation of the current frame. Further, the estimation result with a frequency offset may be output. However, the terminals whose modulus of the auto-correlation estimation result $R_i(n)$ is less than a threshold are marked as non-decision terminals. That is because the signal quality is low if the auto-correlation estimation result $R_i(n)$ is less than the threshold. The frequency offset obtained according to the auto-correlation estimation result $R_i(n)$ is not credible, and no frequency offset compensation is required.

The marking method is: If there is no frequency offset estimation result output of an active terminal of the current frame, the terminal is marked as a non-decision terminal; if there is a frequency offset estimation result output of a terminal of the current frame, but modulus of auto-correlation estimation result $R_i(n)$ of the terminal is less than a preset threshold, the terminal is marked as a non-decision terminal.

In the first grouping, all terminals may be put into the group that needs no frequency offset compensation. For example, the group with the frequency offset ranging from −500 Hz to 500 Hz in the above embodiment, and the other two groups are empty. Afterward, the terminals except those marked as non-decision terminals in the group are reallocated into the corresponding group according to the frequency offset estimation result of such terminals. The terminals marked as non-decision terminals remain in the original allocated group.

Step 103: The terminals in different groups are scheduled so that the terminals in different groups occupy time frequency resources in different time segments.

Two scheduling methods are provided herein:

Method 1: The terminals in different groups are scheduled to different uplink zones.

Each frame in the WiMAX system may be divided into several zones. The terminals in different groups are scheduled into different uplink zones to facilitate frequency offset compensation for a group in a zone subsequently.

Figure 2:
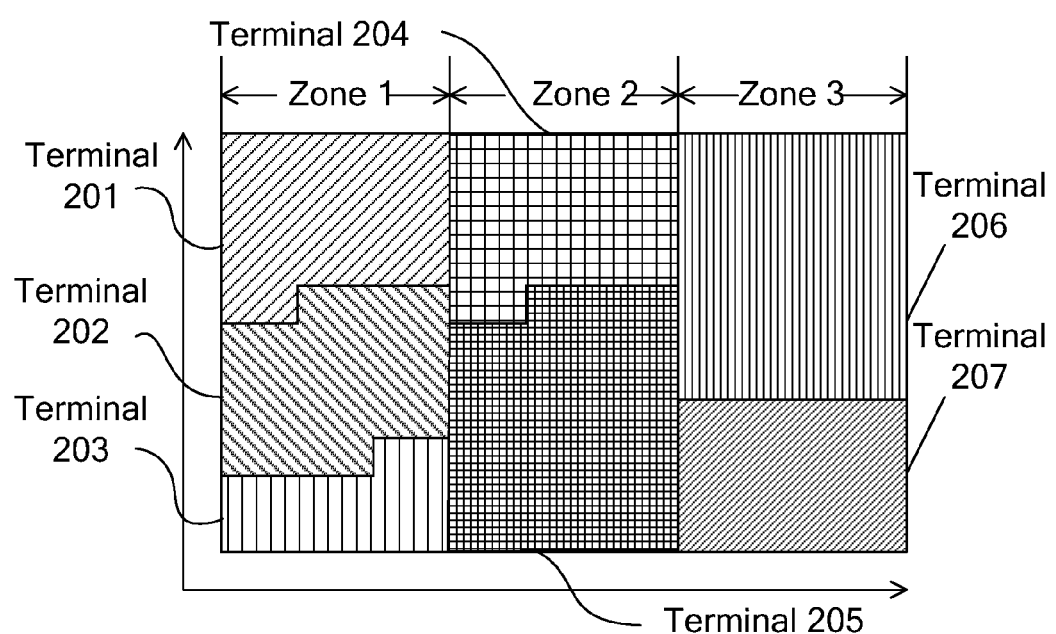
FIG. 2 is a schematic diagram showing a scheduling embodiment of the present invention in which the terminals in different groups are scheduled into different uplink zones.

FIG. 2 shows a scheduling process in which the terminals in different groups are scheduled into different uplink zones in an embodiment of the present invention.

In FIG. 2, the horizontal axis represents time, and the vertical axis represents sub-channel. An uplink frame is divided into three zones, and each zone includes the terminals of the same group. Terminal 201, terminal 202, and terminal 203 are put into a group, and scheduled to zone 1; terminal 204 and terminal 205 are put into a group, and scheduled to zone 2; terminal 206 and terminal 207 are put into a group, and scheduled to zone 3.

Through the first method, all frequency offset compensation can be completed in one frame, and the response speed is high. The first method is applicable to the scenario with few terminals.

Method 2: The terminals in different groups are scheduled to different uplink frames to facilitate frequency offset compensation for a group in an uplink frame subsequently.

Figure 3:
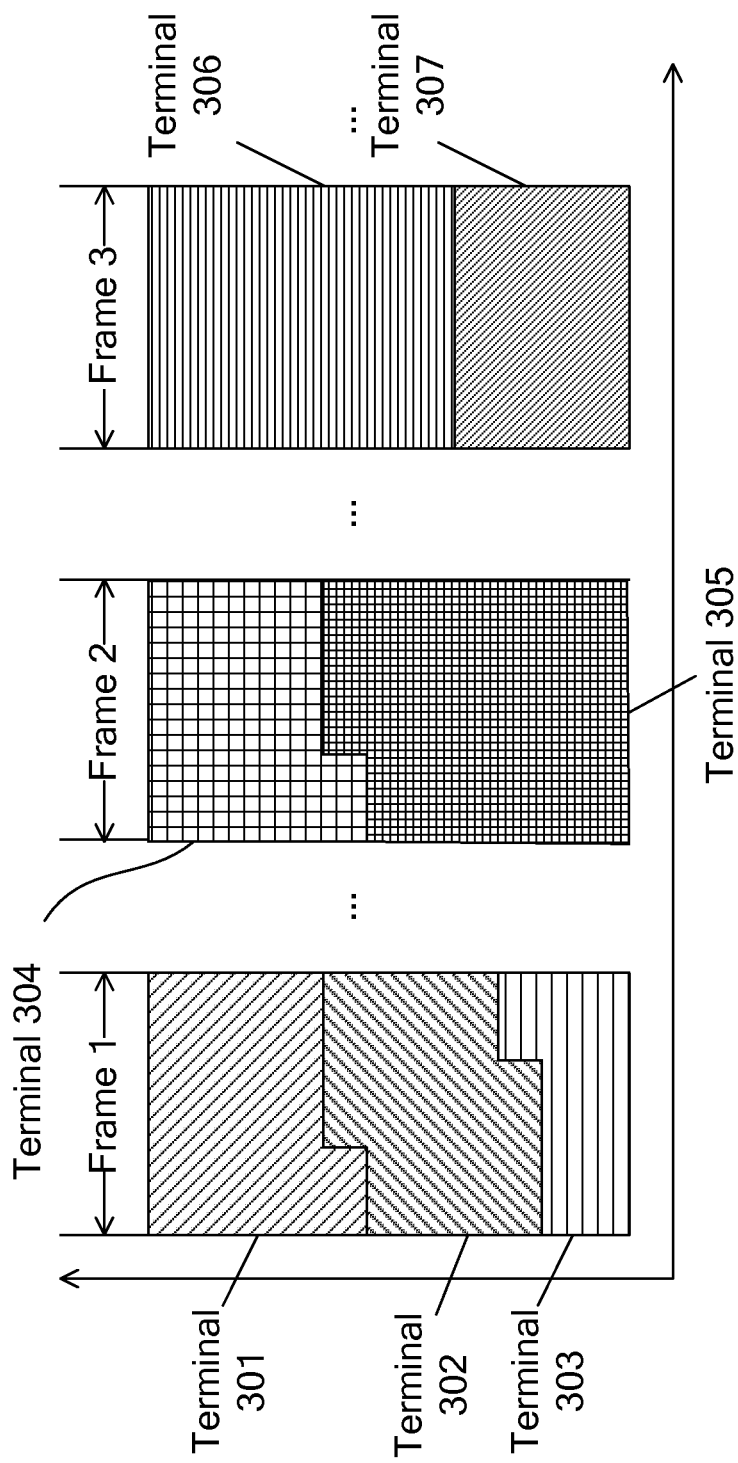
FIG. 3 is a schematic diagram showing a scheduling embodiment of the present invention in which the terminals in different groups are scheduled to different uplink frames.

FIG. 3 shows a scheduling process in which the terminals in different groups are scheduled to different uplink frames in an embodiment of the present invention.

In FIG. 3, the horizontal axis represents time, and the vertical axis represents sub-channel. Each uplink frame includes the terminals of the same group. Terminal 301, terminal 302, and terminal 303 are put into a group, and scheduled to frame 1; terminal 304 and terminal 305 are put into a group, and scheduled to frame 2; terminal 306 and terminal 307 are put into a group, and scheduled to frame 3.

Through the second method, the terminals of the same group are scheduled within a frame, and the resources are sufficient. The second method is applicable to the scenario with many terminals.

Step 104: Frequency offset compensation is performed.

Figure 4:
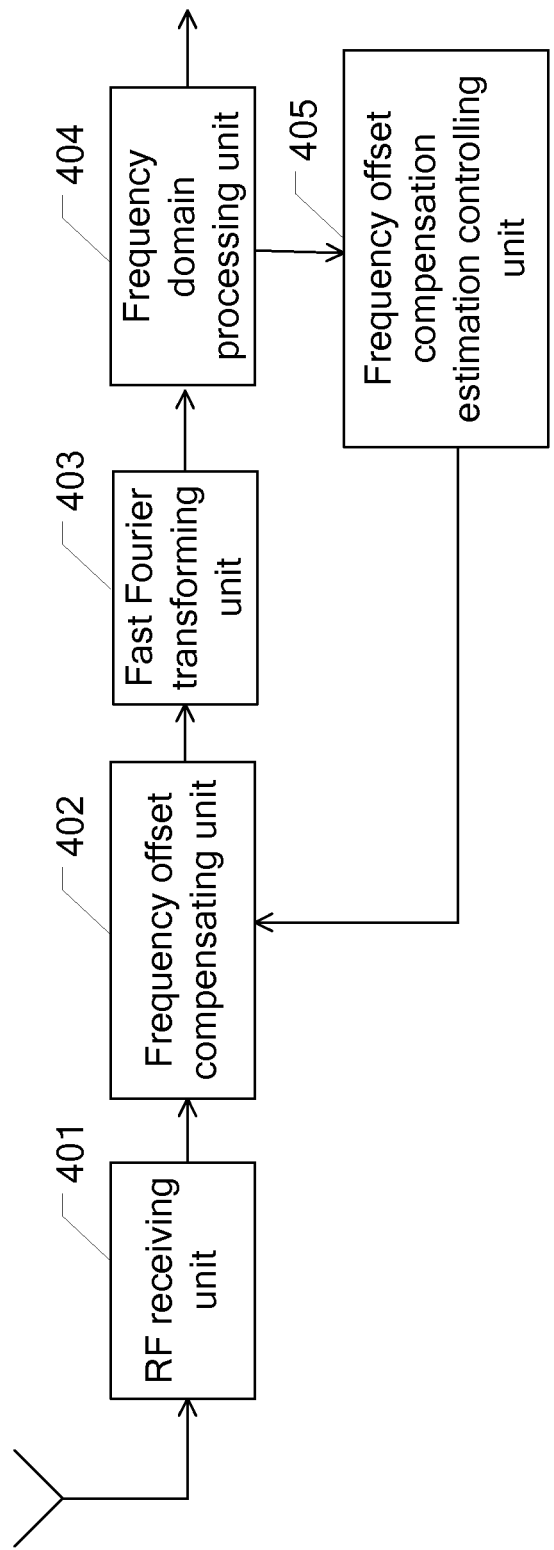
FIG. 4 is a schematic block diagram showing a structure of a system for frequency offset compensation before FFT in an embodiment of the present invention.

Frequency offset compensation is performed before FFT. FIG. 4 shows a structure of a system for frequency offset compensation before FFT. The system includes:

a Radio Frequency (RF) receiving unit 401, configured to receive terminal signals;

a frequency offset compensating unit 402, configured to compensate for the frequency offset of the terminal;

a fast Fourier transforming unit 403, configured to perform fast Fourier transformation by using the data after the frequency offset compensation;

a frequency domain processing unit 404, configured to perform frequency domain processing; and a frequency offset compensation estimation controlling unit 405, configured to: feed back signals to the frequency offset compensating unit 402, and control the estimation result of frequency offset compensation.

Supposing that the frequency offset compensation result, a time domain signal, output by the frequency offset compensating unit is y(n), y(n) is expressed through this formula:

$$y(n)=x(n)*e^{j2\pi\Delta f nTs}$$

where: n is a sample point index; x(n) is an input time domain signal of the frequency offset compensating unit; $\Delta f$ is a frequency offset compensation value; and $T_S$ is a sampling period.

The frequency offset compensation value $\Delta f$ may vary with the frequency offset range of different group. For example, if the frequency offset range is divided into three groups: greater than 500 Hz, from −500 Hz to 500 Hz, and less than −500 Hz, the terminals in the group with frequency offset greater than 500 Hz correspond to the frequency offset compensation value $\Delta f$=1000 Hz; the terminals in the group with frequency offset ranges from −500 Hz to 500 Hz correspond to the frequency offset compensation value $\Delta f$=0 Hz; and the terminals in the group with frequency offset less than −500 Hz correspond to the frequency offset compensation value Δf=−1000 Hz.

Described above is a method for frequency offset compensation in an embodiment of the present invention. Through this method, the BS puts the terminals with a similar frequency offset into one group. The same frequency offset compensation value can be used to compensate for the frequency offset of the terminals in one group, and terminals in different groups are scheduled to different time segments to occupy time frequency resources in different time segments. In this way, the BS can use the same frequency offset compensation value to compensate for the frequency offset of the terminals in a group in the same time, and does not need to occupy the downlink air interface bandwidth, thus saving the radio air interface resources. It is not necessary for the terminal to wait for the scheduler to deliver a message, and it is not necessary for the terminal to perform demodulation. Compared with the prior art, the embodiments of the present invention involve short delay and respond to the frequency offset change quickly.

The apparatus for frequency offset compensation provided in an embodiment of the present invention is generally located at the BS side, and is generally a BS.

Figure 5:
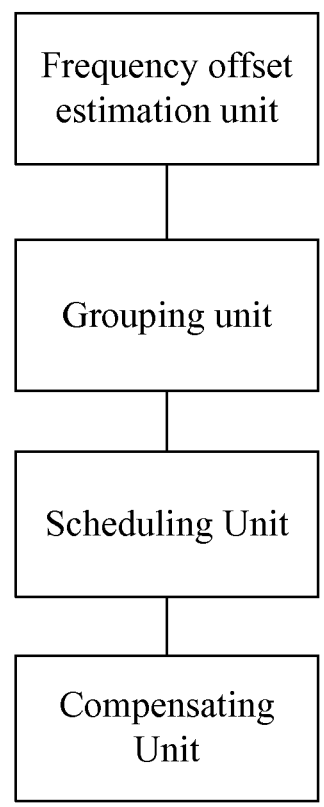
FIG. 5 is a schematic block diagram showing a structure of an apparatus for frequency offset compensation in an embodiment of the present invention.

With reference to FIG. 5, there is depicted a frequency offset compensation apparatus, designated generally by reference numeral 500, that includes:

a frequency offset estimating unit 510, configured to estimate the frequency offset of a terminal according to pilots in the uplink signals of the terminal;

a grouping unit 520, configured to group terminals according to the frequency offset of each terminal by allocating the terminals that can use the same frequency offset compensation value for compensation into a same group;

a scheduling unit 530, configured to schedule the terminals in different groups to enable the terminals in different groups to occupy time frequency resources in different time segments; and a compensating unit 540, configured to perform compensation for the frequency offset of the terminals in each group with frequency offset compensation value corresponding to each group in chronological order.

The frequency offset estimating unit 510 further includes:

a first frequency offset estimating unit 512a, configured to: obtain an auto-correlation estimation result of the terminal according to an auto-correlation value of the pilots, and obtain frequency offset of the terminal according to the auto-correlation estimation result; or a second frequency offset estimating unit 512b, configured to: obtain an auto-correlation estimation result of the terminal according to an auto-correlation value of the pilots, filter the auto-correlation estimation result with an Infinite Impulse Response (IIR) filter, and obtain frequency offset of the terminal according to the filtered auto-correlation estimation result.

The grouping unit 520 further includes:

a section unit 522, configured to: divide a frequency offset range into different sections, where frequency offset values in the same section correspond to a same frequency offset compensation value; and a section grouping unit 524, configured to allocate the terminals, whose frequency offset values fall within the same section, into a same group according the frequency offset of the terminals.

The section grouping unit further includes:

a marking unit 526, configured to mark the terminal that needs no frequency offset compensation as non-decision terminal; and an adjusting unit 528, configured to: allocate all terminals to a group that needs no frequency offset compensation, and reallocate the terminal other than the non-decision terminal to the group corresponding to the frequency offset of the terminal.

The marking unit 526 further includes:

a first marking unit 527a, configured to mark the terminal without frequency offset estimation result output, as non-decision terminal, after the estimating frequency offset of the terminal; or a second marking unit 527b, configured to mark the terminal without frequency offset estimation result output and the terminal with frequency offset estimation result output whose modulus of the auto-correlation estimation result is less than a preset threshold, as non-decision terminals, after the estimating frequency offset of the terminal.

The scheduling unit 530 further includes:

a zone scheduling unit 532, configured to schedule the terminals in different groups to different uplink zones; or a frame scheduling unit 534, configured to schedule the terminals in different groups to different uplink frames.

The operation mode of the frequency offset compensation apparatus provided in this embodiment is similar to that described in the method for frequency offset compensation described above, and is not described further.

Through the apparatus for frequency offset compensation of an embodiment of the present invention, the BS puts the terminals with a similar frequency offset into one group. The same frequency offset compensation value can be used to compensate for the frequency offset of the terminals in one group, and terminals in different groups are scheduled to different time segments to occupy time frequency resources in different time segments. In this way, the BS can use the same frequency offset compensation value to compensate for the frequency offset of the terminals in a group in the same time, and does not need to occupy the downlink air interface bandwidth, thus saving the radio air interface resources. It is not necessary for the terminal to wait for the scheduler to deliver a message, and it is not necessary for the terminal to perform demodulation. Compared with the prior art, the embodiments of the present invention involve short delay and respond to the frequency offset change quickly.

It is understandable to those skilled in the art that all or part of the steps of the foregoing embodiments may be implemented by hardware instructed by a computer program. The program may be stored in a computer-readable storage medium. The storage medium may be a Read-Only Memory (ROM), a magnetic disk, or a Compact Disk (CD).

Detailed above are a Method and Apparatus for Frequency Offset Compensation of embodiments of the present invention. Although the invention is described through several exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What claim is:

1. A method of frequency offset compensation, comprising:

estimating a frequency offset of each terminal in a plurality of terminals according to pilots in uplink signals of a terminal;

grouping the terminals according to the frequency offset of each terminal by allocating the terminals that can use a same frequency offset compensation value for compensation into a same group;

scheduling the terminals in different groups to enable the terminals in different groups to occupy time frequency resources in different time segments; and performing compensation for the frequency offset of the terminals in each group with frequency offset compensation value corresponding to each group, wherein the estimating the frequency offset of each terminal comprises:

obtaining an auto-correlation estimation of the terminal according to an auto-correlation value of the pilots, and obtaining the frequency offset of the terminal according to the auto-correlation estimation;

obtaining an auto-correlation estimation of the terminal according to an auto-correlation value of the pilots, filtering the auto-correlation estimation with an Infinite Impulse Response (IIR) filter, and obtaining the frequency offset of the terminal according to the filtered auto-correlation estimation.

2. The method of claim 1, wherein a frequency offset range is divided into different sections, and frequency offset values in the same section correspond to a same frequency offset compensation value; and the grouping terminals according to the frequency offset of each terminal comprises: allocating the terminals whose frequency offset values fall within the same section into a same group.

3. The method of claim 2, wherein the allocating the terminals whose frequency offset values fall within the same section into a same group comprises:

marking the terminal that needs no frequency offset compensation as non-decision terminal;

allocating all terminals to a group that needs no frequency offset compensation; and reallocating the terminal other than the non-decision terminal to the group corresponding to the frequency offset of the terminal.

4. The method of claim 2, wherein, the scheduling the terminals in different groups to enable the terminals in different groups to occupy time frequency resources in different time segments comprises:

scheduling the terminals in different groups to different uplink zones; or scheduling the terminals in different groups to different uplink frames.

5. The method of claim 3, wherein the marking the terminal that needs no frequency offset compensation as non-decision terminal comprises:

marking the terminal without frequency offset estimation result output, as non-decision terminal, after the estimating frequency offset of the terminal; or marking the terminal without frequency offset estimation result output and the terminal with frequency offset estimation result output whose modulus of the auto-correlation estimation result is less than a preset threshold, as non-decision terminals, after the estimating frequency offset of the terminal.

6. The method of claim 3, wherein, the scheduling the terminals in different groups to enable the terminals in different groups to occupy time frequency resources in different time segments comprises:

scheduling the terminals in different groups to different uplink zones; or scheduling the terminals in different groups to different uplink frames.

7. The method of claim 5, wherein, the scheduling the terminals in different groups to enable the terminals in different groups to occupy time frequency resources in different time segments comprises:

scheduling the terminals in different groups to different uplink zones; or scheduling the terminals in different groups to different uplink frames.

8. The method of claim 1, wherein, the scheduling the terminals in different groups to enable the terminals in different groups to occupy time frequency resources in different time segments comprises:

scheduling the terminals in different groups to different uplink zones;

or scheduling the terminals in different groups to different uplink frames.

9. The method of claim 1, wherein, the scheduling the terminals in different groups to enable the terminals in different groups to occupy time frequency resources in different time segments comprises:

scheduling the terminals in different groups to different uplink zones; or scheduling the terminals in different groups to different uplink frames.

10. A base station with an apparatus of frequency offset compensation, wherein the apparatus comprises:

a frequency offset estimating unit, configured to estimate a frequency offset of each terminal in a plurality of terminals according to pilots in uplink signals of the terminal;

a grouping unit, configured to group terminals according to the frequency offset of each terminal by allocating the terminals that can use a same frequency offset compensation value for compensation into a same group;

a scheduling unit, configured to schedule the terminals in different groups to enable the terminals in different groups to occupy time frequency resources in different time segments; and a compensating unit, configured to perform compensation for the frequency offset of the terminals in each group with frequency offset compensation value corresponding to each group;

wherein the frequency offset estimating unit comprises:

a first frequency offset estimating unit, configured to obtain an auto-correlation estimation of each terminal according to the auto-correlation value of the pilots, and obtain frequency offset of the terminal according to the auto-correlation estimation; a second frequency offset estimating unit, configured to obtain an auto-correlation estimation of each terminal according to the auto-correlation value of the pilots, filter the auto-correlation estimation with an Infinite Impulse Response (IIR) filter, and obtain frequency offset of the terminal according to the filtered auto-correlation estimation.

11. The base station of claim 10, wherein the grouping unit comprises:

a section unit, configured to: divide a frequency offset range into different sections, wherein, frequency offset values in the same section correspond to a same frequency offset compensation value; and a section grouping unit, configured to allocate the terminals, whose frequency offset values fall within the same section, into a same group according the frequency offset of the terminals.

12. The base station of claim 11, wherein the section grouping unit comprises:
    a marking unit, configured to mark the terminal that needs no frequency offset compensation as non-decision terminal; and
    an adjusting unit, configured to: allocate all terminals to a group that needs no frequency offset compensation, and reallocate the terminal other than the non-decision terminal to the group corresponding to the frequency offset of the terminal.

13. The base station of claim 11, wherein the scheduling unit comprises:
    a zone scheduling unit, configured to schedule the terminals in different groups to different uplink zones; or
    a frame scheduling unit, configured to schedule the terminals in different groups to different uplink frames.

14. The base station of claim 12, wherein the marking unit comprises:
    a first marking unit, configured to mark the terminal without frequency offset estimation result output, as non-decision terminal, after the estimating frequency offset of the terminal; or
    a second marking unit, configured to mark the terminal without frequency offset estimation result output and the terminal with frequency offset estimation result output whose modulus of the auto-correlation estimation result is less than a preset threshold, as non-decision terminals, after the estimating frequency offset of the terminal.

15. The base station of claim 12, wherein the scheduling unit comprises:
    a zone scheduling unit, configured to schedule the terminals in different groups to different uplink zones; or
    a frame scheduling unit, configured to schedule the terminals in different groups to different uplink frames.

16. The base station of claim 14, wherein the scheduling unit comprises:
    a zone scheduling unit, configured to schedule the terminals in different groups to different uplink zones; or
    a frame scheduling unit, configured to schedule the terminals in different groups to different uplink frames.

17. The base station of claim 10, wherein the scheduling unit comprises:
    a zone scheduling unit, configured to schedule the terminals in different groups to different uplink zones; or
    a frame scheduling unit, configured to schedule the terminals in different groups to different uplink frames.

18. The base station of claim 10, wherein the scheduling unit comprises:
    a zone scheduling unit, configured to schedule the terminals in different groups to different uplink zones; or
    a frame scheduling unit, configured to schedule the terminals in different groups to different uplink frames.

* * * * *